L. S. LACHMAN.
METHOD OF ELECTRIC WELDING AND APPARATUS.
APPLICATION FILED OCT. 24, 1916.

1,228,032. Patented May 29, 1917.

INVENTOR.
Laurence S. Lachman
BY
Townsend & Decker
ATTORNEYS.

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

METHOD OF ELECTRIC WELDING AND APPARATUS.

1,228,032.  Specification of Letters Patent.  Patented May 29, 1917.

Application filed October 24, 1916. Serial No. 127,325.

*To all whom it may concern:*

Be it known that I, LAURENCE S. LACHMAN, a citizen of the United States, and a resident of New York, in the county of New York and State of New York, have invented certain new and useful Improvements in Methods of Electric Welding and Apparatus, of which the following is a specification.

My invention relates to electric welding and more particularly to that kind of welding in which the work is clamped by an electrode the pressure of which is applied in the direction of the welding pressure and wherein the welding current is supplied to the work through the face of said electrode, as for instance in that class of work wherein rods or bars are welded together in crossed position by a weld formed at the intersection. It will be understood, however, from the following description, that my invention is not limited to the welding of pieces in crossed position.

As is well known in the art, difficulty is experienced in welding a small piece to a large piece or a piece of high resistance to a piece of low resistance and in the case of butt-welding wherein the work is clamped by pressure applied transversely to the line of welding pressure, the tendency of the small piece to reach welding temperature before the large piece reaches suitable welding temperature is compensated for by increasing the projection of the larger piece from said clamps, so that the heat radiation tending to keep the larger piece cool may be lessened, compensation as to the smaller piece being ordinarily also employed by making the projection thereof from the clamp small.

In the case of welding by the process to which my invention relates and which, for convenience of description, will be termed herein the contact electrode process, it has heretofore been proposed to secure approximately equal heating of the pieces of different size or conductivity so as to produce a good weld, by using special forms of metal as in the case of crossing pieces welded together or by special preparation of the metal.

The object of my present invention is to permit welding to be done by the electrode process and approximately equal heating and a good joint to be secured in work in which two bars, rods or other pieces of metal are welded together at a crossing point as well as in other classes of work of similar kind without any special preparation of the work or employment of special forms of metal and by apparatus of the same general construction as that employed for the usual contact electrode welding process.

My invention aims to accomplish, for instance, the welding of a small round bar to a large round bar at a crossing point without preparation of the metal and in a way which will secure an approximately equal heating of the two pieces at the point of weld. This I accomplish by locating the one electrode which engages the larger of the pieces or which for any other reason than its larger bulk tends to heat more slowly, to one side of the line of pressure, or otherwise, to one side of the position of the weld, and regulating or controlling the distance between said electrode and the point where the pieces are engaged and subjected to pressure by the other electrode, according to the size of the larger or more slowly heating piece, thereby regulating its rate of heating so that the proper welding temperature will be reached in both pieces at the location of the welded joint. This regulation of the distance of said electrode may be accomplished in various ways but conveniently is accomplished by providing the electrode for the smaller piece with a working face sufficiently extended to permit the smaller piece to be located in different positions under its electrode so as to practically vary the distance of the welded joint from the electrode for the more slowly heating piece. Plainly, however, resort might be had to the converse arrangement of making either electrode movable to and from the other to accomplish the same result of regulating or predetermining the rate of heating of the larger piece by varying the distance of the electrode which engages the same from the location of the weld.

The accompanying drawings illustrate diagrammatically the principle of my invention as embodied in the essential elements of a contact electrode welding apparatus.

Figure 1:
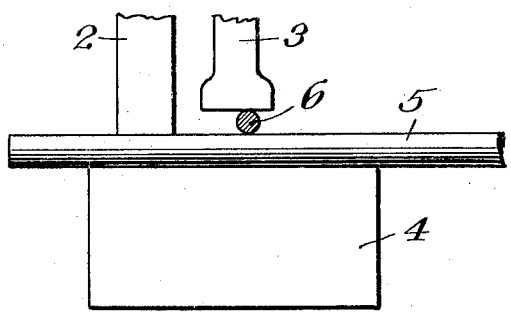
Figure 1 shows the invention as carried out in an apparatus wherein the electrodes are both applied to the same side of the work.

2 and 3 designate respectively the two electrodes which engage by their working faces with the work, the electrode 3 being in this instance the one which is mainly instrumental in applying the pressure while at the same time feeding current into the work in the direction of the line of pressure. The electrode 2 in this instance is located to one side of the electrode 3 and its office is mainly to conduct current into the work.

4 represents a bed of insulation or steel or other suitable material upon which the work rests. The work is shown as comprising a rod 5 and a rod or bar 6 arranged across rod 5 and shown in section. In this instance the electrode 2 merely feeds current to the work. To permit a regulation of the distance of the point of weld from the electrode 2 so as to predetermine the rate of heating of the piece 5 by restricting the radiation of heat therefrom by way of electrode 2 as may be required, I propose to construct electrode 3 with a bearing face of sufficiently large extent to permit the part 6 of the work to be located at any desired point or distance from the electrode 2 and yet be engaged by the welding electrode 3 to permit the weld to be effected in the ordinary way by the application of current and pressure communicated to the work by electrode 3. By thus merely modifying the welding electrode 3 so that the piece with which it engages may be located in any desired position with relation to the electrode 2, it becomes possible to weld pieces of different comparative sizes or which, for any other reason, tend to reach the welding temperature at different rates. Furthermore it is obvious that the usual appliances commonly resorted to in the art for operating the electrode 3 may be employed or for bringing the electrode 2 into engagement with the work, and that in other respects the construction ordinarily employed in contact electrode welding machines may also be adopted.

Figure 2:
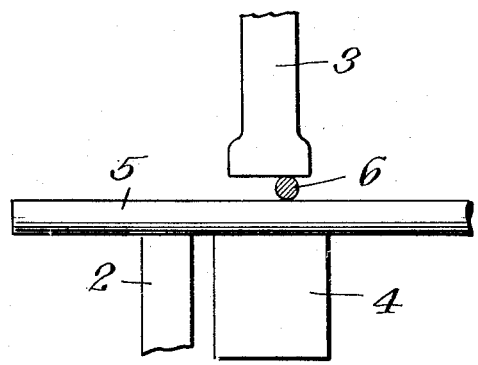
Fig. 2 shows the same as employed in an apparatus in which they are applied to opposite sides of the work.

In the Fig. 2 I show the electrodes located respectively on opposite sides of the work, the electrode 2 being placed beneath and serving partially to back up the larger piece and receive the welding pressure applied by the electrode 3. In this instance, of course, it will be necessary to employ a bed or block 4 opposite the electrode 3 as before.

What I claim as my invention is:—

1. The method of welding pieces tending to heat at different rates by the contact electrode process, consisting in applying the current bearing electrodes to the work on parallel lines and regulating the distance between the electrode which engages the piece having the tendency to heat more slowly and the welding point to secure approximately equal heating of the pieces.

2. The method of welding two rods or pieces of different size together at the crossing point by the contact electrode process, consisting in applying the current bearing electrode engaging the larger piece to said piece at one side of the line of welding pressure and regulating the distance between said electrode and the line of welding pressure or position of the weld to secure approximately equal heating.

3. The method of welding crossing pieces of metal by the contact electrode process, consisting in inserting the work between one of said electrodes and a suitable base to apply welding pressure and bringing the other electrode into contact with that one of the two pieces which tends to heat the more slowly and in a position to one side of the line of welding pressure regulating the distance between the weld and said electrode according to the tendency of the pieces to heat at different rates and applying current and effecting the weld by the operation of the electrode engaging the other piece.

4. In an electric welding apparatus for welding by the contact electrode process, the combination of two electrodes one of which is applied to the work on a line to one side of the welding pressure but substantially parallel therewith, while the other is provided with an extended contact surface to permit the weld to be made at any one of a number of desired distances from the first-named electrode.

Signed at New York, in the county of New York and State of New York, this 17th day of August, A. D. 1916.

LAURENCE S. LACHMAN.

Witnesses:
C. F. TISCHNER, Jr.,
F. B. TOWNSEND.

Copies of this patent may be obtained for five cents each, by addressing the "Commissioner of Patents, Washington, D. C."